(12) United States Patent
Kim

(10) Patent No.: US 7,708,930 B2
(45) Date of Patent: May 4, 2010

(54) COMPOSITE MATERIAL REINFORCED WITH NANOFIBER AND METHOD OF MANUFACTURING FOR THE SAME

(75) Inventor: Hak-Yong Kim, Jeonju-si (KR)

(73) Assignee: Industrial Cooperation Foundation Chonbuk National University, Jeonju-si (KR)

( * ) Notice: Subject to any disclaimer, the term of this patent is extended or adjusted under 35 U.S.C. 154(b) by 300 days.

(21) Appl. No.: 11/917,332

(22) PCT Filed: Mar. 16, 2006

(86) PCT No.: PCT/KR2006/000962

§ 371 (c)(1),
(2), (4) Date: Dec. 12, 2007

(87) PCT Pub. No.: WO2007/046576

PCT Pub. Date: Apr. 26, 2007

(65) Prior Publication Data

US 2009/0305022 A1    Dec. 10, 2009

(30) Foreign Application Priority Data

Oct. 19, 2005    (KR) ...................... 10-2005-0098619

(51) Int. Cl.
*B29C 47/00*    (2006.01)
(52) U.S. Cl. .................................... 264/465; 428/292.1
(58) Field of Classification Search ................. 264/465; 428/292.1
See application file for complete search history.

(56) References Cited

U.S. PATENT DOCUMENTS

| 6,641,773 | B2 * | 11/2003 | Kleinmeyer et al. | ........ 264/452 |
| 6,713,011 | B2 * | 3/2004 | Chu et al. | ................... 264/465 |
| 2005/0233021 | A1 * | 10/2005 | Chun et al. | ........... 425/174.8 E |

FOREIGN PATENT DOCUMENTS

KR    2004-76006    *    8/2004

* cited by examiner

*Primary Examiner*—N. Edwards
(74) *Attorney, Agent, or Firm*—Birch, Stewart, Kolasch & Birch, LLP

(57) ABSTRACT

Disclosed are a nano fiber reinforced composite and a method of manufacturing the same. A spinning dope (nano fiber forming spinning dope) having a viscosity capable of fiber formation upon electrospinning and a spinning dope (spinning dope for matrix) having a viscosity incapable of fiber formation upon electrospinning are electrically spun onto the same collector with a high voltage applied thereto through different nozzles of the same nozzle block with a high voltage applied thereto. In the nano fiber reinforced composite, nano fibers are uniformly arranged between matrix components with no fibers formed therein, the nano fibers being arranged at an orientation angle of 90° or less relative to the longitudinal axis of the composite material. The nano fibers used as reinforcing material can be uniformly distributed within matrix components by a single procedure, and the contact area between the nano fibers and the matrix components are very large because the diameter of the nano fibers used as reinforcing material is small.

10 Claims, 3 Drawing Sheets

COMPOSITE MATERIAL REINFORCED WITH NANOFIBER AND METHOD OF MANUFACTURING FOR THE SAME

TECHNICAL FIELD

The present invention relates to a composite material reinforced with nano fiber (nano fiber reinforced composite) and a method of manufacturing the same, and more particularly, to a method of manufacturing a composite having nano fibers used as reinforcing material uniformly distributed by a single procedure by electrically spinning a spinning dope (hereinafter, referred to as a "nano fiber forming spinning dope") having a viscosity capable of fiber formation upon electrospinning and a spinning dope (hereinafter, referred to as a "spinning dope for matrix") having a viscosity incapable of fiber formation upon electrospinning onto the same collector through different nozzles in the same nozzle block, and a composite material prepared thereby.

In the present invention, the nano fiber refers to a fiber having a fiber diameter 1,000 nm or less, and more preferably, 500 nm or less.

BACKGROUND ART

Generally, composites, such as artificial leather, in which nano fibers used as reinforcing materials are dispersed in matrix components have been prepared in such a manner that a nonwoven fabric is prepared from nano fibers, and then a solution with the matrix components dissolved in a solvent is impregnated or sprayed into the nonwoven fabric by an additional procedure.

However, the above conventional method requires an additional procedure of impregnating or spraying the matrix components into the nonwoven fabric, which makes the procedure complex and which have limitations in allowing the matrix components to be uniformly distributed between the nano fibers.

More specifically, the conventional method of preparing artificial leather, which is an example of composites, will be described. A composite fiber, made by conjugated-spinning the fiber forming component and the extracting component in a sea-island type or division type in order to make fibers ultrafine, is cut to prepare staple fibers, the staple fibers are laminated in the form of a web and needle-punched to prepare a nonwoven fabric, a polyurethane solution dissolved in a solvent of dimethyl formamide or the like is impregnated in the nonwoven fabric, and then the extracting component in the nonwoven fabric is dissolved out by treating the nonwoven fabric with a solvent such as caustic soda, thereby preparing artificial leather.

The above conventional method of preparing artificial leather has problems like a small contact are between the fibers and the matrix components (polyurethane) because the procedure is not continuous and it is difficult to make the diameter of the fibers 1 micrometer or less.

As another method of preparing a fiber reinforced composite, U.S. Pat. No. 4,511,663 suggests a method of dispersing carbon fibers coated with a metal in matrix components of glass or glass-ceramics or the like by a reinforcing material. Additionally, U.S. Pat. No. 5,725,710 suggests a method in which a continuous filament is passed through a solution with thermoplastic powder dispersed in water, the water is removed, and the thermoplastic powder is melted onto the continuous filament. U.S. Pat. No. 6,818,288 suggests a method of positioning layers of woven fiber fabric in matrix components, such as carbon, by reinforcing material.

However, the above conventional methods are not continuous, and the composites are not reinforced with nano fibers, thus the contact area between the matrix components and the reinforcing material is small, thereby deteriorating the physical properties such as resistance to deformation.

To solve the conventional problems, it is an object of the present invention to prepare by a continuous and simple procedure a composite which is superior in physical properties due to a large contact area between matrix components and reinforcing material (nano fibers).

DETAILED DESCRIPTION OF THE INVENTION

Technical Problems

The present invention is intended to provide a nano fiber reinforced composite by a continuous and simple procedure by simultaneously electrically spinning a nano fiber forming spinning dope and a spinning dope for matrix on the same collector.

Additionally, the present invention is intended to improve the physical properties of composites, such as tensile stress, by greatly increasing the contact area between nano fibers and matrix components by using nano fibers having a diameter of 1 micrometer or less as reinforcing material.

Technical Solutions

To solve the above-described problems, there is provided a method of manufacturing a nano fiber reinforced composite according to the present invention, wherein a spinning dope (nano fiber forming spinning dope) having a viscosity capable of fiber formation upon electrospinning and a spinning dope (spinning dope for matrix) having a viscosity incapable of fiber formation upon electrospinning are electrically spun onto the same collector 5 with a high voltage applied thereto through different nozzles 2a, 2b, and 2c of the same nozzle block 2 with a high voltage applied thereto.

Additionally, there is provided a nano fiber reinforced composite according to the present invention, wherein nano fibers are uniformly arranged between matrix components with no fibers formed therein, the nano fibers being arranged at an orientation angle of 90° or less relative to the longitudinal axis of the composite material.

Hereinafter, the present invention will be described in detail with reference to the accompanying drawings.

First, in the present invention, as shown in FIGS. 1 to 3, nano fiber forming spinning dope A and spinning dope for matrix B supplied from spinning dope main tanks 7a and 7b, respectively, are electrically spun onto the same collector 5 with a high voltage applied thereto through different nozzles 2a, 2b, and 2c of the same nozzle block 2 with a high voltage applied thereto, thereby preparing a composite in which nano fibers used as reinforcing material are dispersed in matrix components.

The composite formed on the collector 5 is fed by a feed roller 4, and then wound on a winding roller 6. If required, a residual solvent may be removed by using a drier or the like before winding. If the matrix components are thermosetting ones, they may be cured by using a heater, ultraviolet equipment, laser equipment, etc.

FIG. 1 is a schematic process view of the present invention. FIGS. 2 and 3 are pattern diagrams showing a state of the nozzle block 2 of FIG. 1.

In the present invention, one of spinning dope or two or more types of spinning dopes can be used as a spinning dope (nano fiber forming spinning dope) having a viscosity incapable of fiber formation upon electrospinning).

Additionally, one of spinning dope or two or more types of spinning dopes can be used as a spinning dope (spinning dope for matrix) having a viscosity incapable of fiber formation.

FIG. 2 is a schematic perspective showing a state of the nozzle block simultaneously electrically spinning two types of spinning dopes. FIG. 3 is a schematic perspective showing a state of the nozzle block simultaneously electrically spinning three types of spinning dopes.

The nanofiber forming spinning dope forms nano fibers upon electrospinning, thus serving as reinforcing material, while the spinning dope for matrix does not form nano fibers upon electrospinning, thus serving as a matrix component after being sprayed on the collector 5 in a liquid state.

The spinning dopes (nano fiber forming spinning dope) having a viscosity capable of fiber formation upon electrospinning include a thermoplastic resin solution, a sol-gel solution containing metal, a solution containing a carbon nano fiber, and one of solution selected from mixed solutions thereof.

The spinning dopes (spinning dope for matrix) having a viscosity incapable of fiber formation upon electrospinning include a thermosetting resin solution, a thermoplastic resin solution, a sol-gel solution containing metal, a solution containing a carbon nano fiber, and one of solution selected from mixed solutions thereof.

The content ratio of matrix components and nano fibers in a composite can be adjusted by the ratio of the number of nozzles for spinning a nano fiber forming spinning dope and the number of nozzles for spinning a spinning dope for matrix.

As electrospinning methods, an upward spinning method in which a nozzle block is positioned at a lower part of a collector, a downward spinning method in which a nozzle block is positioned at an upper part of a collector, and a horizontal spinning method in which a collector is positioned on a straight line are all applicable.

More preferably, the upward electrospinning method is selected for processibility.

The nozzle block 2 consists of one or more unit blocks. As the nozzle block 2, a C-shaped nozzle block surrounding one side of the collector 5, a cylindrical nozzle block consisting of one or more unit blocks, or a plate-shaped nozzle block having nozzles arranged in a row or in a diagonal direction can be used.

For example, a nylon solution capable of fiber formation upon electrospinning and a polyurethane solution incapable of fiber formation are simultaneously electrically spun on the same collector in the method as shown in FIG. 2, thereby preparing artificial leather with polyurethane (matrix component) uniformly impregnated between nylon nano fibers.

Such a method enables a combination of various types of materials. For instance, it is possible to prepare a hybrid composite easily by making fibers different in thickness by using two or more types of dopes or differentiating the concentration of polymer, and then supplying a solution (e.g., urethane resin) incapable of fiber formation between them. Further, it is also possible to prepare a very complex hybrid composite easily by using two or more types of polymer dopes capable of nano fiber formation and two or more types of polymer dopes incapable of nano fiber formation.

Additionally, the physical properties of the prepared composite can be further improved by electrically spinning a polymer dope having no fiber forming properties, while simultaneously preparing a web having electrospun fibers arranged side by side in the longitudinal direction of the web.

If it is desired to arrange the prepared nano fibers in the longitudinal direction of the web, they are electrically spun on the collector rotating at a high speed. For example, a composite is prepared by using a system in which a nozzle block consists of one or more unit blocks, a nano fiber forming spinning dope and a spinning dope for matrix can be simultaneously put into these unit blocks, and a collector located at the center of the cylindrical nozzle block rotates at a high speed. If it is desired to obtain a better result, a nano fiber forming spinning dope is electrically spun on a collector rotating faster than 5 m/sec to arrange fibers side by side in the machine direction, and at the same time a spinning dope for matrix is electrically sprayed, thereby preparing a more superior composite.

The composite prepared in the method of the present invention has nano fibers uniformly arranged between matrix components, and has such a structure in which the nano fibers are arranged at an angle of ±90° or less, more preferably ±60° or less, relative to the longitudinal axis of the composite.

Due to this, the composite of the present invention is very superior in physical properties such as tensile stress or the like.

Advantageous Effects

The present invention is simple in procedure and high in productivity because a nano fiber reinforced composite is prepared by a continuous procedure.

Additionally, the composite of the present invention is reinforced with nano fibers having a small diameter, thus the contact area between matrix components and the nano fibers are increased a lot, and accordingly various physical properties such as tensile stress are greatly improved.

EXPLANATION OF REFERENCE NUMERALS FOR THE MAJOR PARTS IN THE DRAWINGS

Figure 1:
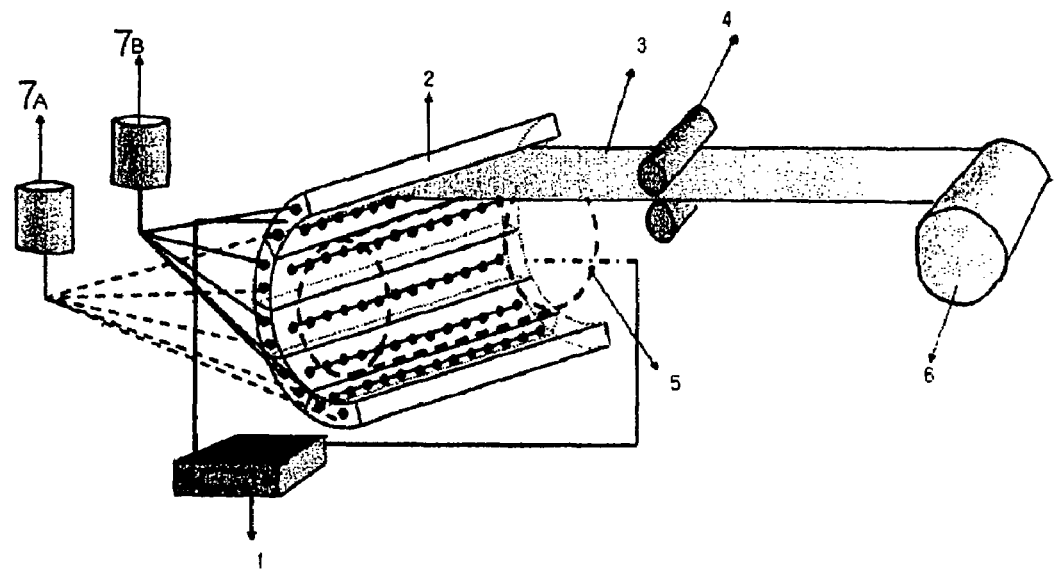
FIG. 1 is a schematic process view of the present invention.

1: high voltage generator 2: nozzle block 3: nano fiber reinforced composite
4: feed roller 5: collector 6: winding machine 7a, 7b: spinning dope main tank
A: spinning dope having a viscosity capable of forming nano fibers upon electrospinning (nano fiber forming spinning dope)
B: spinning dope having a viscosity incapable of forming nano fibers upon electrospinning (spinning dope for matrix)
C: nano fiber forming spinning dope or spinning dope for matrix

BEST MODE FOR CARRYING OUT THE INVENTION

The present invention is now understood more concretely by examples. However, the present invention is not limited to such examples.

EXAMPLE 1

A nano fiber forming spinning dope A was prepared by dissolving nylon 6 resin (manufactured by Kolon Industries Inc.,) which has a relative viscosity of 2.8 in a 98% sulfuric acid solution, in a mixed solvent of formic acid/acetic acid (ratio: 70:30) at a concentration of 20% by weight.

The prepared nano fiber forming spinning dope A had a viscosity of 1,050 centipose, and an electric conductivity of 143 mS/m at 20° C.

A spinning dope for matrix B was prepared by dissolving polycarbonate resin (TRIREX 3022P from Samyang Kasei Co., Ltd.) having a molecular amount of 22,000 in methylene chloride at a concentration of 5% by weight.

The prepared spinning dope for matrix B had a viscosity of 20 centipose, and an electrical conductivity of 0.003 mS/m.

Figure 2:
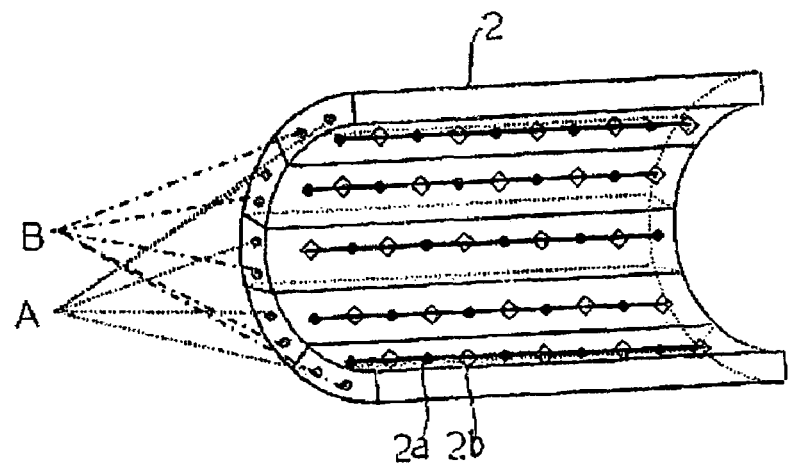
FIG. 2 is a schematic perspective showing a state of a nozzle block electrically spinning two spinning dopes A and B through different nozzles.
Figure 3:
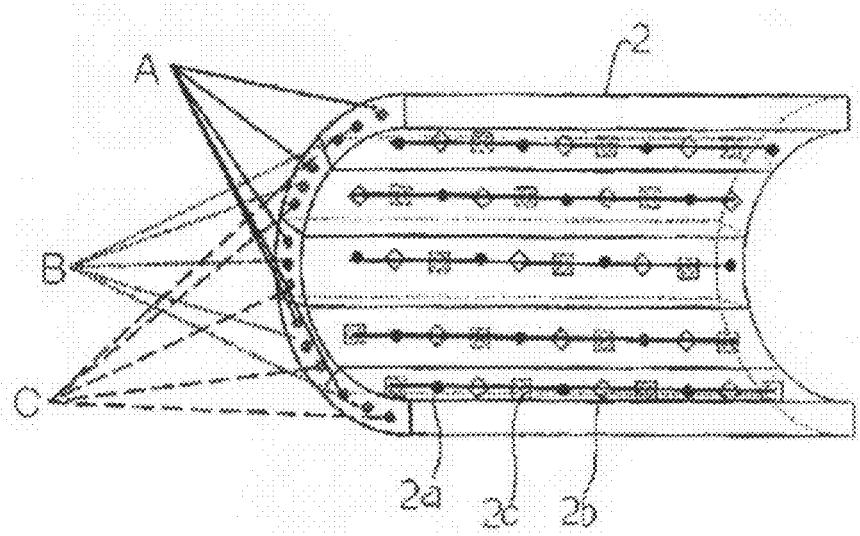
FIG. 3 is a schematic perspective showing a state of a nozzle block electrically spinning three spinning dopes A, B, and C through different nozzles.

As shown in FIGS. 1 and 2, the prepared two types of spinning dopes were electrically spun onto a cylindrical conductive material (stainless steel) collector 3, which has a high voltage applied thereto and rotates at a rotation linear velocity of 10 m/min, with one side covered by a nozzle block 2, through nozzles 2a and 2b in the nozzle block 2, the nozzle block 2 having a high voltage applied thereto and 128 unit blocks combined in a C-shape, and arranged in a transverse direction, thereby collecting a nano fiber reinforced composite on the collector 3.

At this time, the nozzles 2a spinning the nano fiber forming spinning dope A and the nozzles 2b spinning the spinning dope for matrix B were arranged in an alternating manner so that the ratio of the nozzles can be 2:1.

The collector rotates by being connected to a rotary motor by a connecting rod, and the length thereof was 200 cm and the radius thereof was 185 cm. The radius of the nozzle block 2 was 200 cm, and the length thereof was 180 cm. 72 nozzles were arranged in a transverse direction in one unit block of the nozzle block 2, thus the total number of nozzles in the nozzle block 2 was 12,090. The diameter of the nozzles was 1 mm, the voltage thereof was 35 kV, and the spinning distance thereof was 13 cm.

Next, the nano fibers collected on the collector 7 were separated in by using a feed roller 6, dried by a drier, and then wound after removing the residual solvent, thereby preparing a nano fiber reinforced composite.

Figure 4:
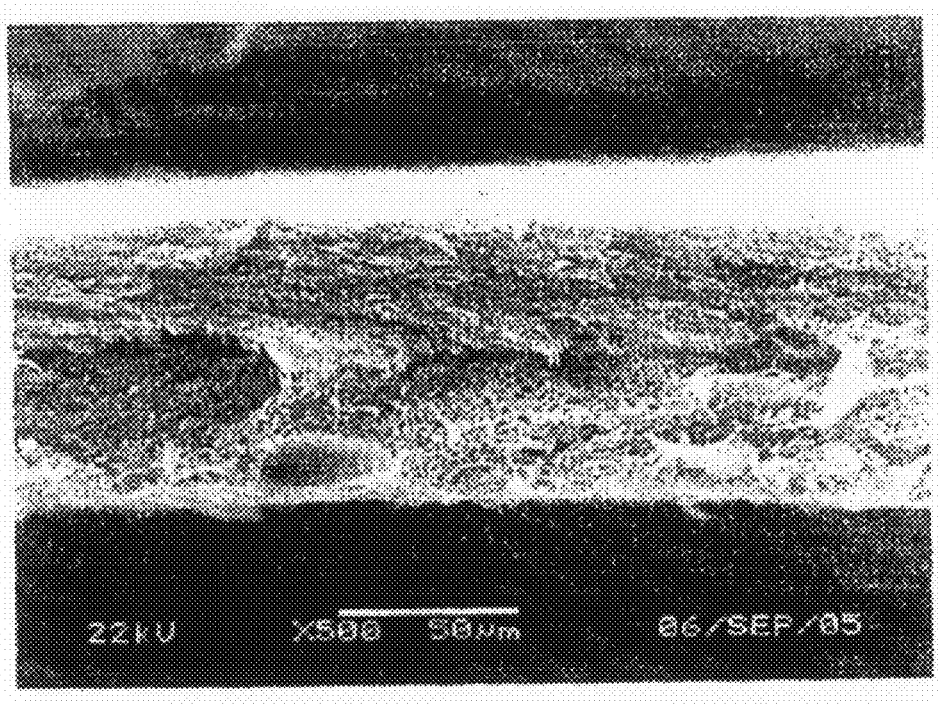
FIG. 4 is an electro micrograph showing a lateral state of a composite prepared by Example 1.
Figure 5:
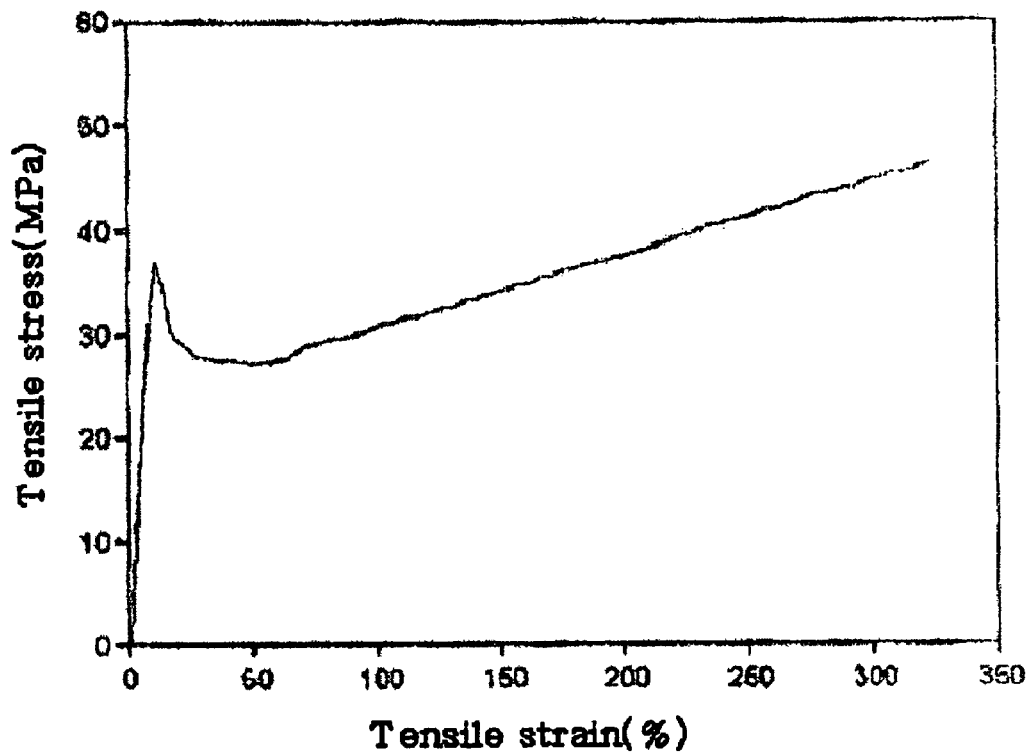
FIG. 5 is an electro micrograph showing the tensile stress and the tensile strain of a composite prepared by Example 2.

An electro micrograph of a lateral side of the prepared composite is as shown in FIG. 4, and a tensile stress-strain curve of the prepared composite is as shown in FIG. 5.

INDUSTRIAL APPLICABILITY

The present invention is useful as materials for artificial leather because various physical properties, such as tensile stress, are superior.

What is claimed is;

1. A method of manufacturing a nano fiber reinforced composite, wherein a spinning dope (nano fiber forming spinning dope) having a viscosity capable of fiber formation upon electrospinning and a spinning dope (spinning dope for matrix) having a viscosity incapable of fiber formation upon electrospinning are electrically spun onto the same collector 5 with a high voltage applied thereto through different nozzles 2a, 2b, and 2c of the same nozzle block 2 with a high voltage applied thereto.

2. The method of claim 1, wherein the spinning dope (nano fiber forming spinning dope) having a viscosity capable of fiber formation upon electrospinning and the spinning dope (spinning dope for matrix) having a viscosity incapable of fiber formation upon electrospinning are of one or two or more.

3. The method of claim 1, wherein the spinning dopes (nano fiber forming spinning dope) having a viscosity capable of fiber formation upon electrospinning is one selected from the group consisting of a thermoplastic resin solution, a sol-gel solution containing metal, a solution containing a carbon nano fiber, and mixtures thereof.

4. The method of claim 1, wherein the spinning dopes (spinning dope for matrix) having a viscosity incapable of fiber formation upon electrospinning is one selected from the group consisting of a thermosetting resin solution, a thermoplastic resin solution, a sol-gel solution containing metal, a solution containing a carbon nano fiber, and mixtures thereof.

5. The method of claim 1, wherein the electrospinning method is one selected from the group consisting of an upward spinning method in which a nozzle block is positioned at a lower part of a collector, a downward spinning method in which a nozzle block is positioned at an upper part of a collector, and a horizontal spinning method in which a collector is positioned on a straight line are all applicable.

6. The method of claim 1, wherein the nozzle block 2 consists of one or more unit blocks, and has a C-shape surrounding one side of the collector 5.

7. The method of claim 1, wherein the nozzle block 2 consists of one or more unit blocks and has a cylindrical shape.

8. The method of claim 1, wherein the nozzle block 2 has a plate shape in which nozzles are arranged in a row or in a diagonal direction.

9. A nano fiber reinforced composite prepared by the method of claim 1, wherein nano fibers are uniformly arranged between matrix components with no fibers formed therein, the nano fibers being arranged at an orientation angle of ±90° or less relative to the longitudinal axis of the composite material.

10. The nano fiber reinforced composite of claim 9, wherein the orientation angle of the nano fibers relative to the longitudinal axis of the composite is ±60° or less.

* * * * *